(12) United States Patent
Yu et al.

(10) Patent No.: US 10,964,235 B1
(45) Date of Patent: Mar. 30, 2021

(54) ELECTRONIC DEVICES WITH NARROW BORDER DISPLAYS

(71) Applicant: Apple Inc., Cupertino, CA (US)

(72) Inventors: Cheng-Ho Yu, Milpitas, CA (US); Xiaofeng Wang, San Jose, CA (US); ByoungSuk Kim, Palo Alto, CA (US); Chun-Yao Huang, San Jose, CA (US); Fenghua Zheng, San Jose, CA (US); Hopil Bae, Sunnyvale, CA (US); Patrick B. Bennett, Alameda, CA (US); Steven M. Scardato, Sunnyvale, CA (US); Yi Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/428,375

(22) Filed: May 31, 2019

Related U.S. Application Data

(60) Provisional application No. 62/689,656, filed on Jun. 25, 2018.

(51) Int. Cl.
*G09F 9/302* (2006.01)
*G06F 1/16* (2006.01)

(52) U.S. Cl.
CPC ............ *G09F 9/302* (2013.01); *G06F 1/1601* (2013.01)

(58) Field of Classification Search
CPC .. G09F 9/302; G06F 1/1601; G02F 1/136286; G02F 1/13629; G02F 1/136295; G02F 1/1365; G02F 1/1368; G02F 1/13624; G09G 3/3275; G09G 2310/0297
USPC ....................................................... 345/204
See application file for complete search history.

(56) References Cited

U.S. PATENT DOCUMENTS

| | | | |
|---|---|---|---|
| 7,782,694 B2 | 8/2010 | Kodaira et al. | |
| 10,038,154 B2 | 7/2018 | Lee et al. | |
| 10,607,549 B2* | 3/2020 | Aflatooni | G09G 3/3275 |
| 2005/0110727 A1* | 5/2005 | Shin | G09G 3/20 |
| | | | 345/76 |
| 2009/0243978 A1* | 10/2009 | Yamamoto | G09G 3/3233 |
| | | | 345/76 |
| 2013/0235279 A1* | 9/2013 | Sugisaka | G02F 1/1345 |
| | | | 348/739 |
| 2014/0210875 A1* | 7/2014 | Sumi | G09G 3/00 |
| | | | 345/694 |

(Continued)

*Primary Examiner* — Tom V Sheng
(74) *Attorney, Agent, or Firm* — Treyz Law Group, P.C.; Jason Tsai

(57) ABSTRACT

An electronic device may include a display. The display includes display driver circuitry for driving data lines routed across the display. The electronic device may have a recessed device housing region, where at least some of the data lines are routed around the recessed region. The data lines being routed around the recessed region may be formed in at least two different metal routing layers. The electronic device may further include additional display driver circuitry for driving data lines from another peripheral housing edge to obviate the need to route around the recessed region. The data lines from the two display driver circuitries can be disconnected at random locations or can be interlaced to achieve spatial interleaving. The display driver circuitry may include demultiplexing circuitry having smaller switches coupled in parallel with larger demultiplexer routing switches to reduce voltage kick and charge injection.

20 Claims, 16 Drawing Sheets

(56) References Cited

U.S. PATENT DOCUMENTS

| | | | |
|---|---|---|---|
| 2014/0307004 A1* | 10/2014 | Roh | G09G 3/3208 |
| | | | 345/690 |
| 2015/0055036 A1* | 2/2015 | Weber | G02F 1/1362 |
| | | | 349/33 |
| 2017/0372661 A1* | 12/2017 | Gu | H01L 27/3276 |
| 2018/0182324 A1* | 6/2018 | Lin | G09G 3/36 |
| 2019/0012947 A1* | 1/2019 | Cheng | G09F 9/00 |
| 2019/0043418 A1* | 2/2019 | Rieutort-Louis | H01L 27/3276 |
| 2019/0043452 A1* | 2/2019 | Silvanto | G06F 1/1688 |
| 2019/0073962 A1* | 3/2019 | Aflatooni | G09G 3/3275 |
| 2019/0156725 A1* | 5/2019 | Hsu | G09G 3/3266 |

* cited by examiner

ELECTRONIC DEVICES WITH NARROW BORDER DISPLAYS

This application claims the benefit of provisional patent application No. 62/689,656, filed Jun. 25, 2018, which is hereby incorporated by reference herein in its entirety.

BACKGROUND

This relates generally to electronic devices and, more particularly, to electronic devices with displays.

Electronic devices often include displays. Displays are typically driven using a display driver circuit and a gate driver circuit. The display driver circuit provides data signals to corresponding display pixels via data lines, whereas the gate driver circuit provides control signals via gate lines to selectively load the data signals into a subset of the display pixels. Displays oftentimes have a rectangular outline. The design of a display with a rectangular outline is generally straightforward since the data lines and gate lines can be routed in a regular grid-like pattern across the display.

Some displays, however, deviate from the rectangular footprint and have a locally narrowed portion that is bowed inwards. It may be challenging to route the data lines and gate lines in such types of displays with an irregular peripheral edge. If care is not taken, the display border near the locally narrowed portion may be overly congested.

SUMMARY

An electronic device may include a display having an array of display pixels. The display may further include display driver circuitry configured to drive data lines providing data signals to the array of display pixels. In one suitable arrangement, at least some of the data lines are routed around and along a depressed device housing portion, and at least some of the data lines are formed in different metal routing layers to reduce a display border width surrounding the depressed device housing portion.

In another suitable arrangement, the display may include first display driver circuitry formed along a first peripheral edge of the device housing and second display driver circuitry formed along a second peripheral edge of the device housing. The first display driver circuitry drives a first set of data lines, at least some which extending directly towards the depressed region are truncated and not routed around the depressed region. Similarly, the second display driver circuitry drives a second set of data lines, at least some of which extending directly towards the depressed region are also truncated and not routed around the depressed region. The first set of data lines and the second set of data lines may be disconnected from one another at random locations to reduce the visibility of undesired display artifacts. Alternatively, the first set of data lines and the second set of data lines are interlaced to achieve higher pixel density.

The display driver circuitry may further include a display driver circuit configured to generate data signals and demultiplexer circuitry configured to route the data signals to the array of display pixels. The demultiplexer circuitry may include at least a first multiplexer routing switch coupling an output line from the display driver circuit to a first display pixel of a given color in the array and a second multiplexer routing switch coupling the output line from the display driver circuit to a second display pixel of the given color. The demultiplexer circuitry may further include a first additional switch coupled in parallel with the first multiplexer routing switch and a second additional switch coupled in parallel with the second multiplexer routing switch. The first and second additional switches may be substantially smaller than the first and second multiplexer routing switches. In particular, the first additional switch should be turned off after the first multiplexer routing switch is turned off when loading a data signal into the first display pixel to help reduce voltage feedthrough and charge injection.

DETAILED DESCRIPTION

Figure 1:
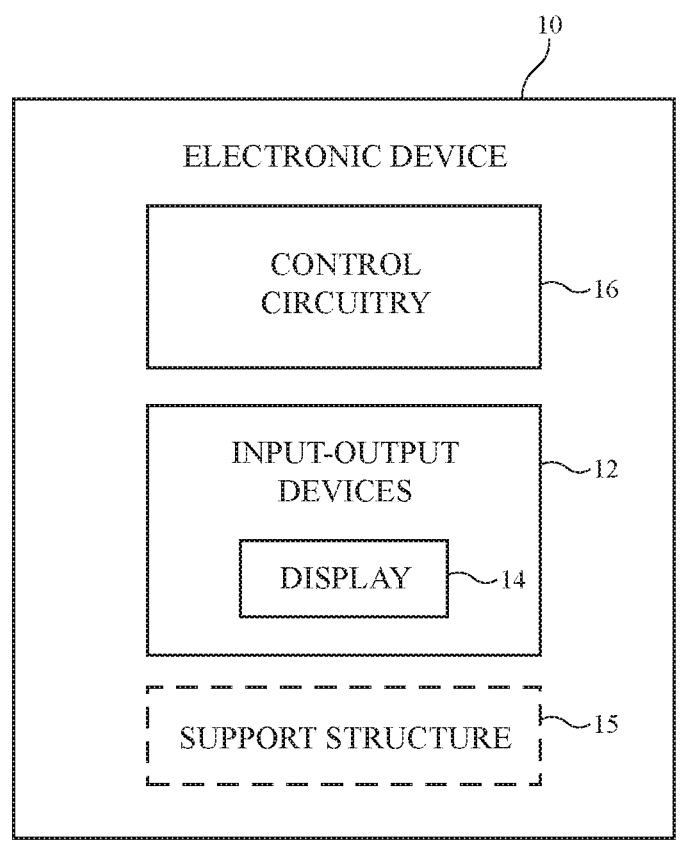
FIG. 1 is a diagram of an illustrative electronic device having a display in accordance with an embodiment.

An illustrative electronic device of the type that may be provided with a display is shown in FIG. 1. Electronic device 10 of FIG. 1 may be a tablet computer, laptop computer, a desktop computer, a monitor that includes an embedded computer, a monitor that does not include an embedded computer, a display for use with a computer or other equipment that is external to the display, a cellular telephone, a media player, a wristwatch device or other wearable electronic equipment, or other suitable electronic device.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 via the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14.

As shown in FIG. 1, device 10 may optionally include a head-mountable support structure such as support structure 15. The components of device 10 may be supported by support structure 15. Support structure 15, which may sometimes be referred to as a housing, may be configured to form a frame of a pair of glasses (e.g., left and right temples and other frame members), may be configured to form a helmet, may be configured to form a pair of goggles, or may have other head-mountable configurations. Device 10 of this type may be head-mounted devices (e.g., head-mounted display devices, head-up display devices, or other display-based equipment) and other electronic devices that are used for virtual reality and mixed reality (augmented reality) systems.

Display 14 may have a rectangular shape (i.e., display 14 may have a rectangular footprint and a rectangular peripheral edge that runs around the rectangular footprint) or may have other suitable shapes. Display 14 may be planar or may have a curved profile. Display 14 may be an organic light-emitting diode display, a liquid crystal display, a liquid-crystal-on-silicon display, a microelectromechanical systems (MEMs) display, or other suitable type of display.

Figure 2:
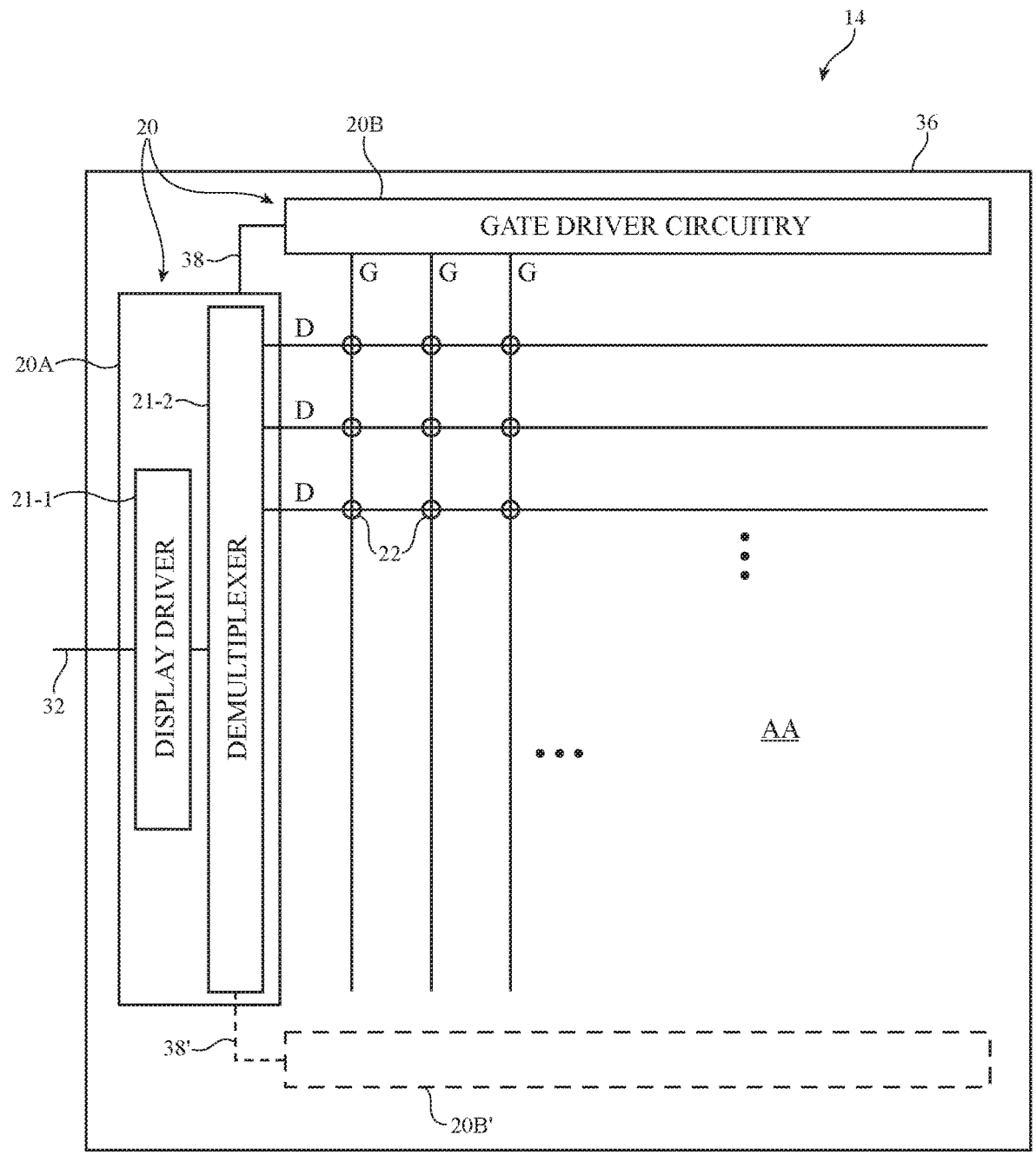
FIG. 2 is a layout view of an illustrative display in an electronic device in accordance with an embodiment.

A layout view of a portion of display 14 is shown in FIG. 2. As shown in FIG. 2, display 14 may have an array of pixels 22 formed from substrate structures such as substrate 36. The region on substrate 36 in which the array of pixels 22 are formed is sometimes referred to as the "active area" (AA). Region(s) outside the area active may be referred to as the inactive area. Substrates such as substrate 36 may be formed from glass, metal, plastic, ceramic, or other substrate materials. Pixels 22 may receive data signals over signal paths such as data lines D and may receive one or more control signals over control signal paths such as gate lines G (sometimes referred to as control lines, scan lines, emission enable lines, gate signal paths, etc.). There may be any suitable number of rows and columns of pixels 22 in display 14 (e.g., tens or more, hundreds or more, or thousands or more). Pixels 22 may have different colors (e.g., red, green, and blue) to provide display 14 with the ability to display color images. The pixel circuits in pixels 22 may contain transistors (e.g., thin-film transistors on substrate 36) having gates that are controlled by gate line signals on gate lines G.

Display driver circuitry 20 may be used to control the operation of pixels 22. Display driver circuitry 20 may be formed from integrated circuits, thin-film transistor circuits, or other suitable circuitry. Thin-film transistor circuitry for display driver circuitry 20 and pixels 22 may be formed from polysilicon thin-film transistors, semiconducting-oxide thin-film transistors such as indium gallium zinc oxide (IGZO) transistors, or thin-film transistors formed from other semiconductor material.

Display driver circuitry 20 may include display driver circuits such as display driver circuitry 20A and gate driver circuitry 20B. Display driver circuitry 20A may include a display driver circuit 21-1 that is formed from one or more display driver integrated circuits (e.g., timing controller integrated circuits) and/or thin-film transistor circuitry and may include demultiplexer circuitry 21-2 (e.g., a demultiplexer formed from thin-film transistor circuitry or formed in an integrated circuit). Gate driver circuitry 20B may be formed from gate driver integrated circuits or may be formed from thin-film transistor circuitry.

Display driver circuitry 20A may contain communications circuitry for communicating with system control circuitry such as control circuitry 16 of FIG. 1 over path 32. Path 32 may be formed from traces on a flexible printed circuit or other conductive lines. During normal operation, the control circuitry (e.g., control circuitry 16 of FIG. 1) may supply circuitry 20A with information on images to be displayed on display 14. To display images on display pixels 22, display driver circuitry 20A may supply image data to data lines D while issuing control signals (e.g., clock signals, a gate start pulse, etc.) to support display driver circuitry such as gate driver circuitry 20B over path 38. Circuitry 20A may also dynamically adjust demultiplexer circuitry 21-2 by supplying clock signals, select signals, and/or other control signals to demultiplexer circuitry 21-2. If desired, gate driver circuitry may optionally be formed on more than one side of display 14 (see, e.g., gate driver circuitry 20B' formed at the opposing edge of substrate 36). In such arrangements, display driver circuitry 20A may also issue control signals to support gate driver circuitry 20B' over path 38'.

Figure 3A:
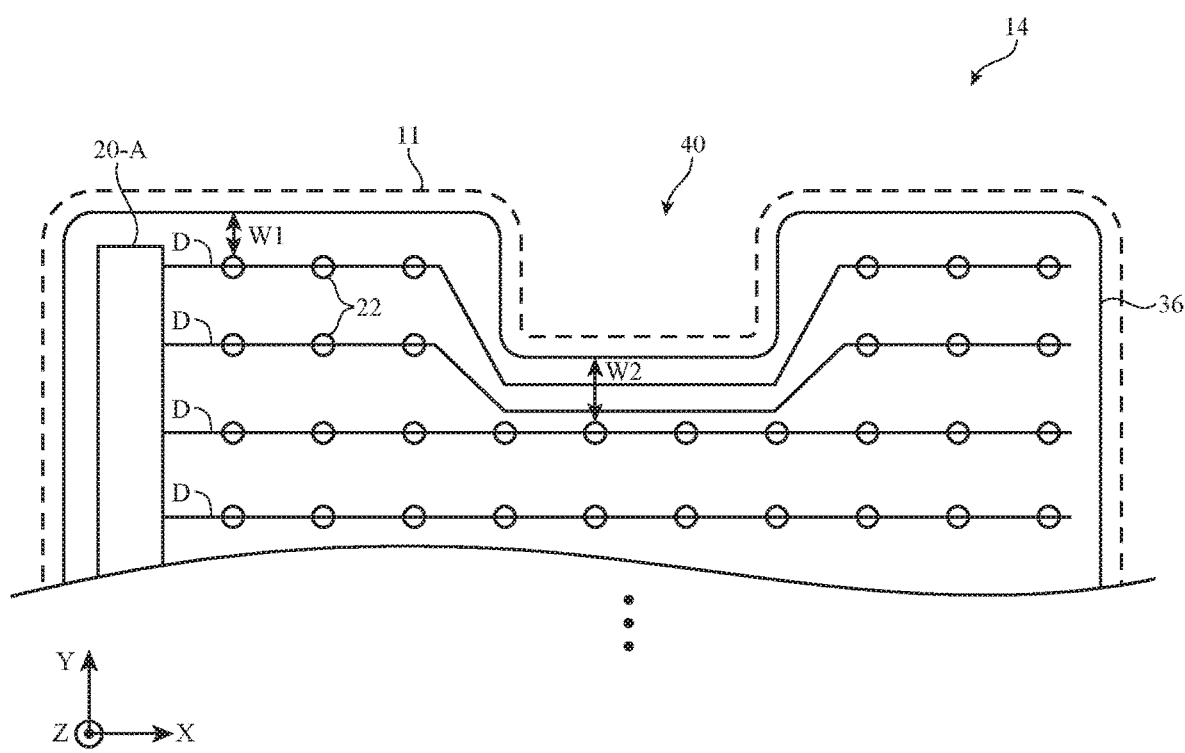
FIG. 3A is a layout view showing how data lines are routed around a recessed portion of an electronic device in accordance with an embodiment.
Figure 3B:
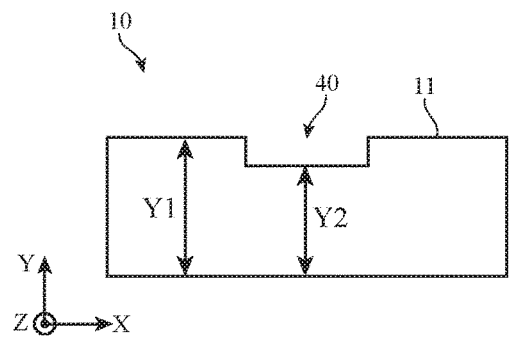
FIGS. 3B-3G are front views of various illustrative electronic device footprints having locally-narrowed portions in accordance with an embodiment.
Figure 3C:
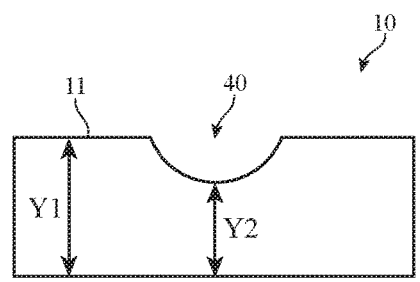

Display 14 need not always have a rectangular shape. FIG. 3A is a layout view showing how display 14 can have a non-rectangular shape when viewed from the front in direction Z towards the X-Y plane. In one suitable arrangement, display 14 may be substantially coplanar with the X-Y plane (i.e., display substrate 36 is formed in a single plane). In another suitable arrangement, display 14 may instead be curved and protrude from the X-Y plane (see, e.g., FIG. 3H viewing electronic device 10 from above in direction Y). As shown in FIG. 3H, electronic device 10 having a curved or otherwise non-planar profile can be mounted to an external object such as object OBJ. In general, device 10 (and display 14) can exhibit any suitable shape when viewed from above.

Referring back to FIG. 3A, display 14 may have a recessed portion such as recessed portion 40. A portion of substrate 36 may be carved out in recessed portion 40. Since substrate 36 is missing in recessed portion 40, no display pixels 22 can be formed in recessed portion 40. Dotted line 11 delineates the peripheral housing edge of the electronic device 10, thus defining the possible outline or footprint of display 14. Recessed portion (or region) 40 that results in the outer housing edge of device 10 to deviate from a substantially straight line can sometimes be referred to as a depressed device housing portion/region, an indented device housing portion/region, a sunken device housing portion/region, a portion/region that is bowed inwards, a locally-narrowed portion/region, a notched portion/region, etc.

In the example of FIG. 3A, display driver circuitry 20A may drive data lines D that extend from the left edge of display 14 to the right edge of display 14 (when viewed in the orientation of FIG. 3A). Gate driver circuitry 20B is also formed on substrate 36 but is omitted from FIG. 3A to avoid obscuring the present embodiments. There may be no display pixels 22 formed in inwardly depressed region 40, but data lines D in the upper rows of display 14 will still have to be routed around region 40. This requirement of routing at least some data lines D to circumvent region 40 might result in routing line congestion near the edge of region 40 along which data lines D are routed to bypass region 40, which would cause display border width W2 (e.g., as measured from display pixels 22 to the edge of substrate 36) to be greater than the nominal display border width W1 where the routing congestion is relatively less pronounced. The example of FIG. 3A in which there are two data lines D that need to be routed around portion 40 is merely illustrative. In general, there may be at least 10, 10-100, more than 100, 100-1000, more than 1000, fewer than 1000, fewer than 500, fewer than 100, or any suitable number of data lines that need to be routed around indented region 40.

The shape of recessed display region 40 in FIG. 3A is merely illustrative and is not intended to limit the scope of the present embodiments. FIGS. 3B-3G are front views of various illustrative electronic device footprints having locally-narrowed or inwardly bowed portions. As shown in FIG. 3B, electronic device 10 has a peripheral housing edge 11 delineating a first wider portion having a width Y1 and a second narrower portion having a width Y2 that is smaller than Y1. In the example of FIG. 3B, region 40 may be substantially rectangular. FIG. 3C shows another example in which region 40 has a dished shaped. Region 40 of this type can sometimes be referred to as a concave device housing portion, a caved-in device housing portion, an incurvate device housing portion, or an inwardly-curved device housing portion.

Figure 3D:
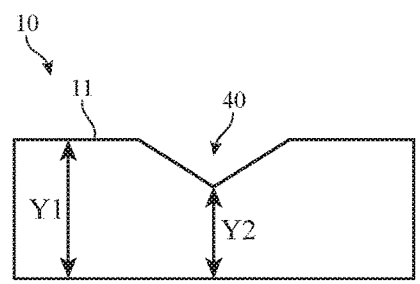
Figure 3E:
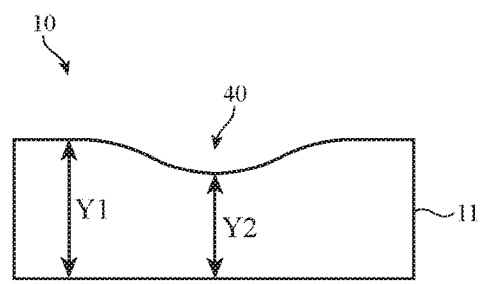
Figure 3F:
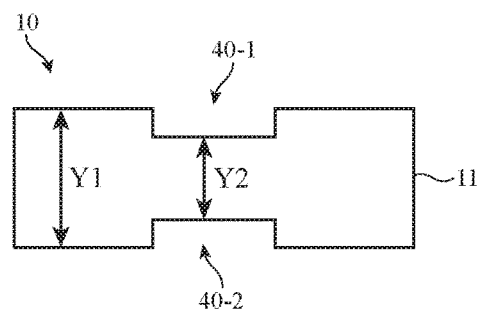
Figure 3G:
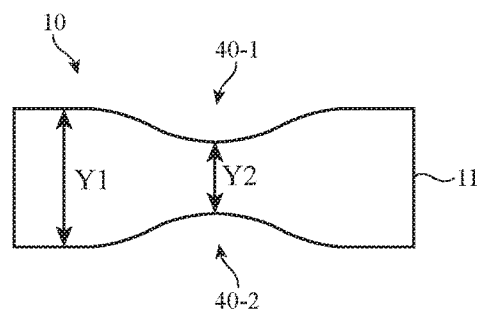
Figure 3H:
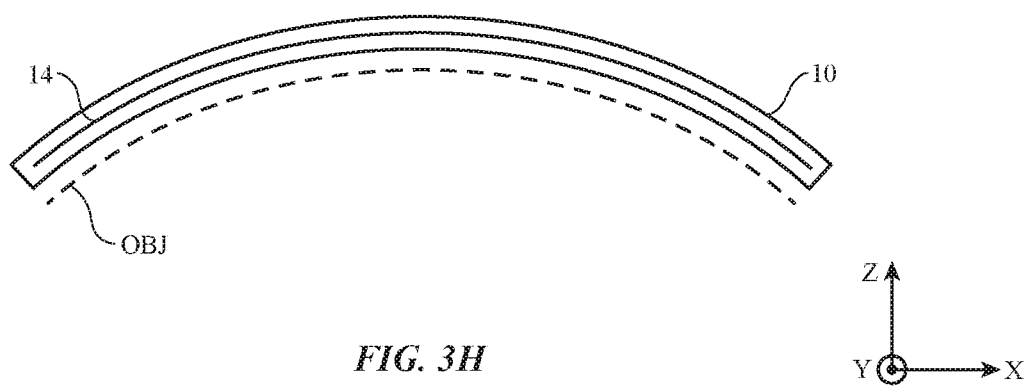
FIG. 3H shows how an electronic device with a curved display can be mounted to an object in accordance with an embodiment.

FIG. 3D shows yet another example in which portion 40 forms a triangular recessed region with straight edges. FIG. 3E shows another example in which portion 40 is depressed or indented in a more subtle fashion relative to the sunken region of FIG. 3C. The exemplary configurations of FIGS. 3A-3E in which device 10 includes one inwardly-bowed portion 40 is merely illustrative. In general, electronic device 10 (and therefore display 14) can have more than one depressed portion. FIG. 3F shows an example in which device 10 includes at least two substantially rectangular recessed regions 40-1 and 40-2 formed at opposing housing edges 11. FIG. 3G shows another example in which device 10 has at least two curved recessed regions 40-1 and 40-2 formed at opposing sides. If desired, device 10 can have any suitable outline or footprint when viewed from the front, and display 14 can include more than one recessed portion 40, at least two recessed portions 40, two to four recessed portions 40, less than four recessed portions 40, or any suitable number of locally depressed regions of any shape where no display pixels can be formed. The one or more recessed device housing portions 40 in device 10 may be configured to accommodate some body part of a user such as the user's head, face, nose, ear, wrist, or finger when device 10 is mounted on that user.

Figure 4A:
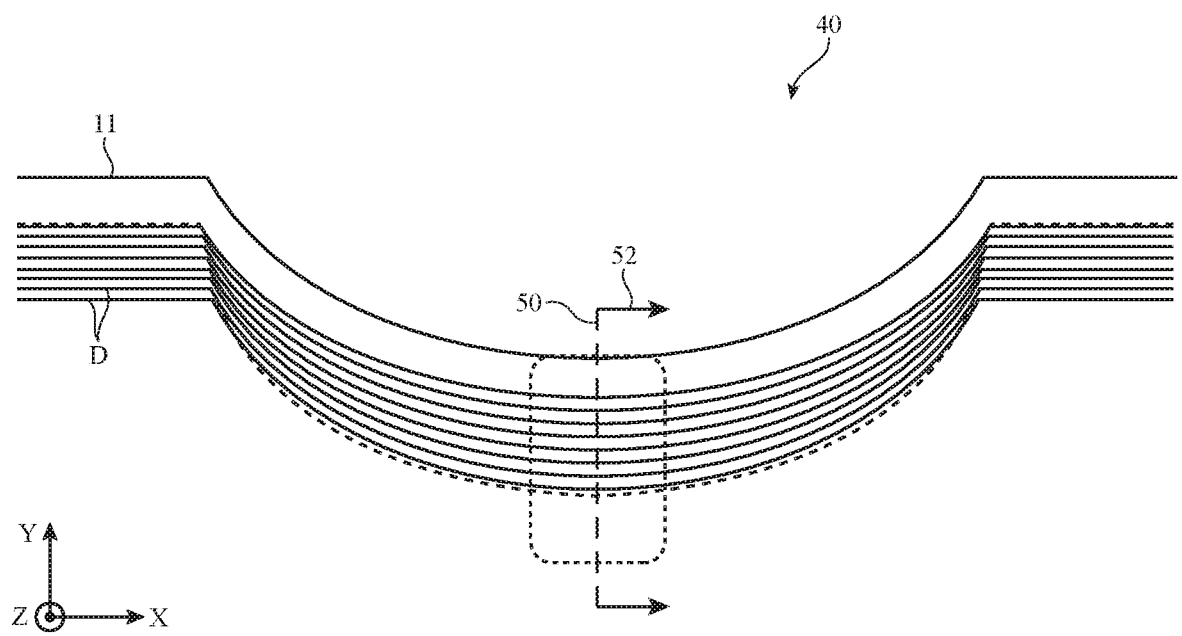
FIG. 4A is a layout view showing how data lines routed along a curved peripheral edge are formed in the same metal routing layer in accordance with an embodiment.
Figure 4B:
FIG. 4B is a cross-sectional side view showing the lateral spacing between the data lines shown in FIG. 4A.

FIG. 4A is a front layout view showing how data lines D routed along a curved peripheral edge 11 around recessed portion 40 are formed in the same metal routing layer in accordance with an embodiment. FIG. 4B shows a cross-sectional side view of data lines D cut along line 50 and viewed in the direction of arrow 52. As shown in FIG. 4B, all of the data lines D are formed in the same metal routing layer (i.e., data lines D are formed on the same dielectric layer in the same plane). Formed in this way, a minimum pitch requirement will require adjacent data lines to be formed a certain distance from each other, which would limit the minimum display border width that is possible along the recessed portion 40.

Figure 5A:
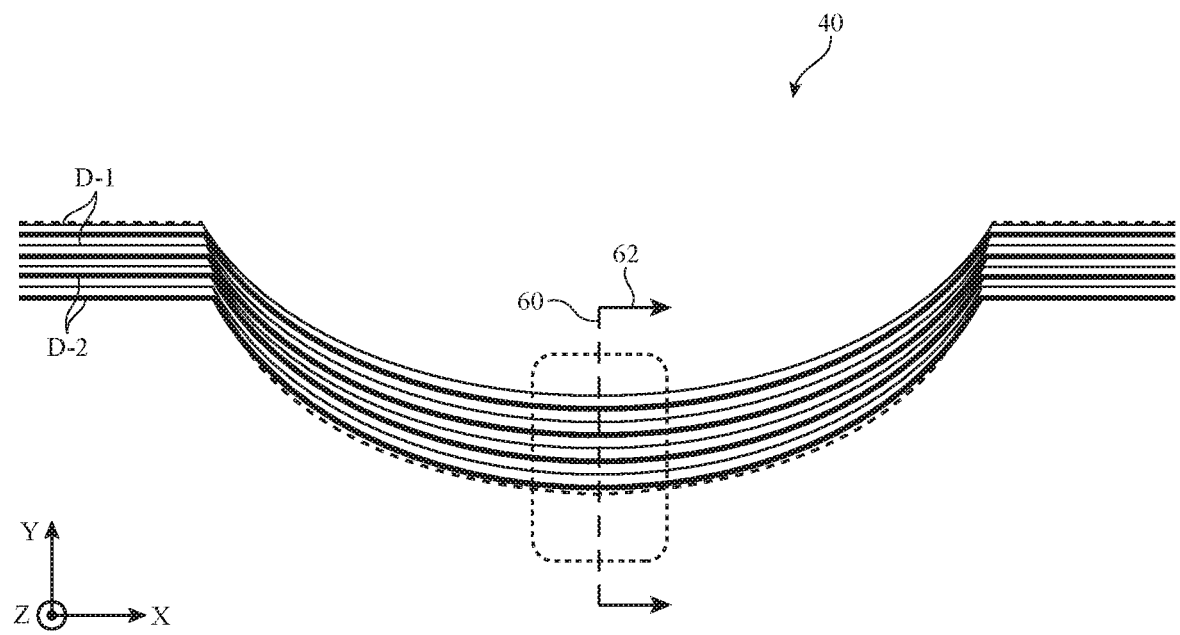
FIG. 5A is a layout view showing how data lines routed along a curved peripheral edge are formed in multiple metal routing layers in accordance with an embodiment.
Figure 5B:
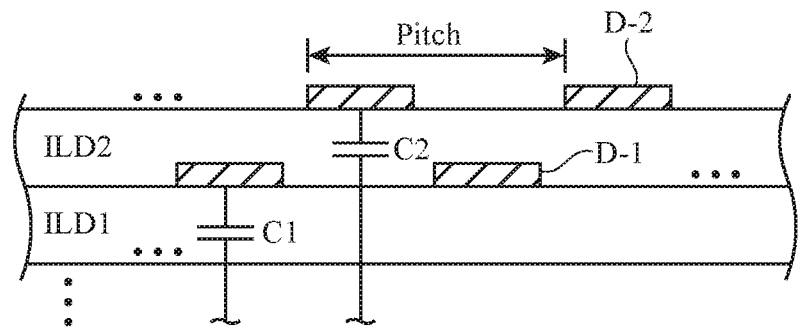
FIG. 5B is a cross-sectional side view showing the lateral spacing between the data liens shown in FIG. 5A.

To help reduce the display border width, the data lines D may be formed in different layers. FIG. 5A is a front layout view showing how a first group of data lines D-1 may be routed in a first metal routing layer, whereas a second group of data lines D-2 may be routed in a second metal routing layer that is different than the first metal routing layer. FIG. 5B shows a cross-sectional side view of data lines D-1 and D-2 cut along line 60 and viewed in the direction of arrow 62. As shown in FIG. 5B, data lines D-1 and D-2 are formed in different layers of a dielectric stack (e.g., data lines D-1 may be formed on a first interlayer dielectric ILD1, whereas data lines D-2 may be formed on a second interlayer dielectric ILD2). Forming data lines in this alternating/interlaced fashion where adjacent data lines are formed in different routing layers in the way show in FIG. 5B allows the data lines to be formed collectively closer together (since the pitch requirement only sets the minimum metal line spacing for each individual layer), which would allow the display border width along the recessed portion 40 to be reduced.

The example of FIG. 5 in which the data lines are formed in two different routing layers is merely illustrative. If desired, data lines D may be formed in more than two routing layers, at least three routing layers, at least four routing layers, 3-12 routing layers, more than 10 routing layers, less than 10 routing layers, less than 5 routing layers, or any suitable number of routing layers in a dielectric stack to help reduce or minimize display border width.

As shown in the example of FIG. 5B, data lines D-1 formed on the first ILD1 layer may exhibit a first parasitic coupling capacitance C1 to other thin-film circuitry formed below, whereas data lines D-2 formed on the second ILD2 layer may exhibit a second parasitic coupling capacitance C2 to the other thin-film circuitry formed below. Since the data lines are formed at different levels, the value of capacitance C1 associated with the first set of data lines D-1 will be different than the value of capacitance C2 associated with the second set of data lines D-2, which will result in a capacitive loading difference between the two sets of data lines that might cause undesired display artifacts.

Figure 6A:
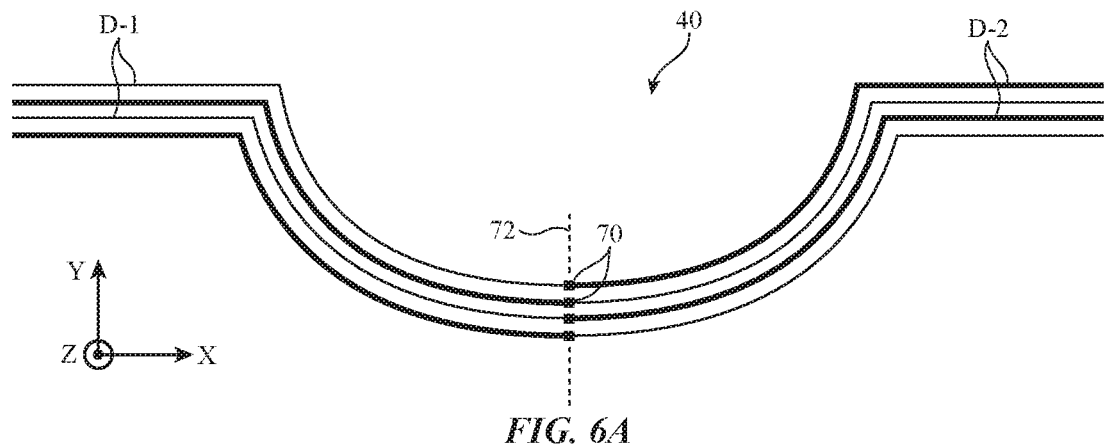
FIGS. 6A-6C are layout views showing how each data line routed along a curved peripheral edge includes multiple segments formed in different metal routing layers in accordance with an embodiment.

To help mitigate the loading difference between adjacent data lines formed in different metal routing layers, each data line may include a first segment formed in the first metal routing layer and a second segment formed in the second metal routing layer. FIG. 6A shows how each data line may include portions formed using at least two different metal routing layers. As shown in FIG. 6A, the first data line has a left segment portion formed in the first metal routing layer (D-1) and a right segment portion formed in the second metal routing layer (D-2). The second data line has a left segment portion formed in the second metal routing layer (D-2) and a right segment portion formed in the first metal routing layer (D-1). The third data line is similar to the first data line and has a left segment portion formed in the first metal routing layer (D-1) and a right segment portion formed in the second metal routing layer (D-2). The fourth data line is similar to the second data line and has a left segment portion formed in the second metal routing layer (D-2) and a right segment portion formed in the first metal routing layer (D-1). Additional data lines can be routed in this alternating fashion. Formed in this way, each data line has a first half portion exhibiting first parasitic loading C1 and a second half portion exhibiting second parasitic loading C2. Since each data line now has substantially equal loading from C1 and C2, the loading difference among the different data lines is reduced or minimized, even if two or more different metal routing layers are used. This technique of dividing up a single data line into segments formed using different metal routing layers to reduce loading difference can be extended to data lines formed in more than two layers.

In the example of FIG. 6A, conductive via structures 70 connecting the different data line segments are all aligned (as indicated by dotted line 72) at the center of recessed region 40. Vias 70 are configured to connect a data line segment in one metal routing layer to a data line segment in another metal routing layer. This is merely illustrative. Aligning vias 70 in the way shown in FIG. 6A might, however, increase display border width since via spacing requirements can be more limiting than metal line spacing requirements.

Figure 6B:
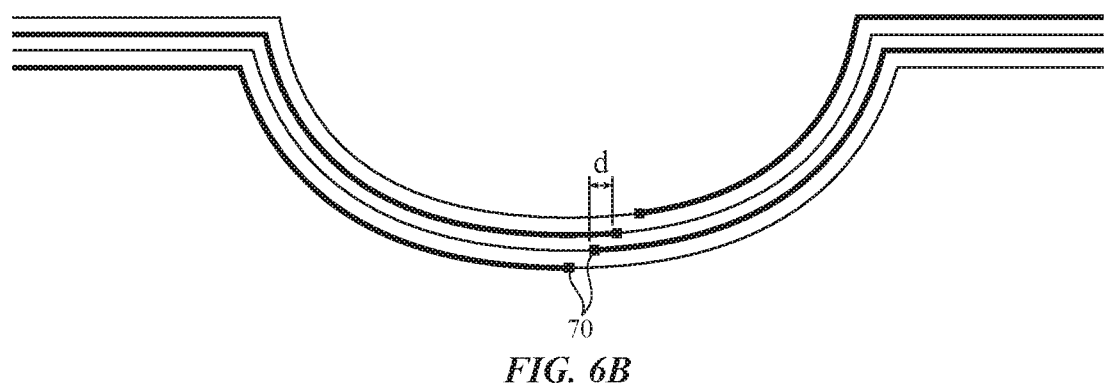
Figure 6C:
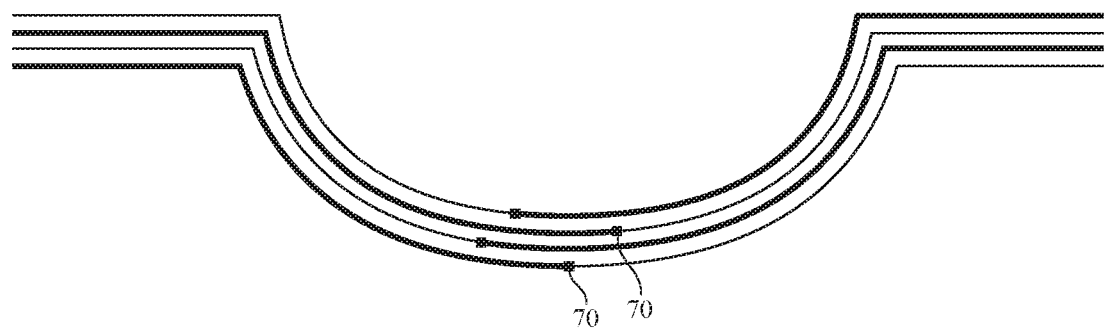

FIG. 6B shows another suitable arrangement in which vias 70 are staggered (i.e., not laterally aligned). Forming vias 70 in this staggered or laterally offset fashion can help optimize for a narrower display border width. At the same time, the distance d between the staggered vias 70 should be minimized to help reduce loading difference among the different data lines. FIG. 6C shows yet another suitable variation in which vias 70 are formed in a more randomized fashion to help reduce display border width while minimizing loading difference. In general, via structures 70 linking the different display line segments can be formed in any suitable location to optimize for narrow display border width while minimizing the loading difference between adjacent data lines. The techniques described in connection with FIGS. 4-6 may be applied to any set of control lines that are routed around or along the peripheral edge of a recessed region 40 of any shape (see, e.g., FIGS. 3A-3G).

In the example of FIG. 3A, the data lines D have to be routed around sunken region 40 in order for display driver circuitry 20A formed along the left edge of display 14 to drive the display pixels 22 formed at the top right corner of display 14. To eliminate the need to route the data lines around region 40, the display driver circuitry may be formed on opposite sides of the display.

Figure 7:
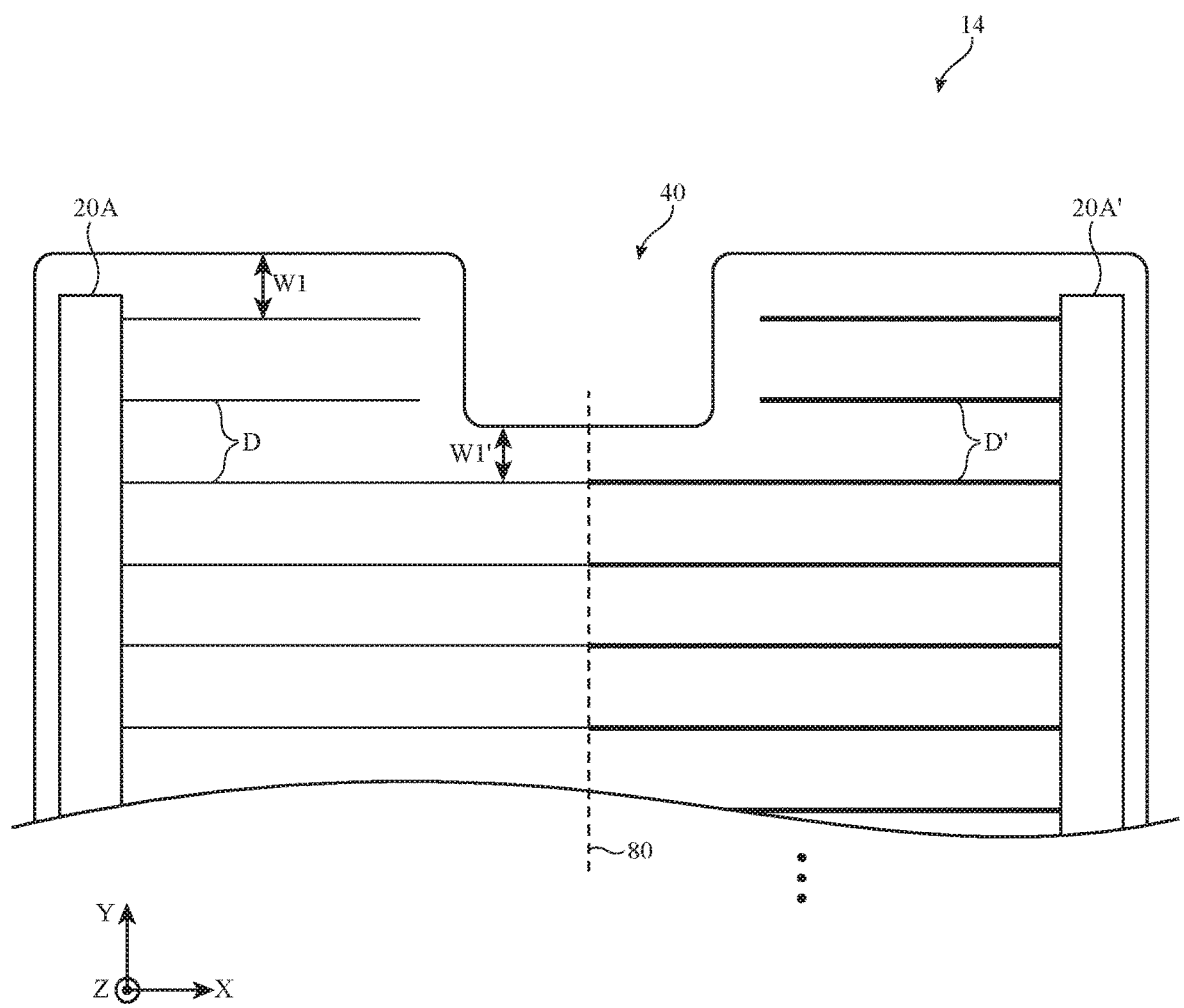
FIG. 7 is a layout view of an illustrative display with at least two separate display driver circuits in accordance with an embodiment.

FIG. 7 is a front layout view of illustrative display 14 with at least two separate display driver circuitries configured to drive data lines from different sides of device 10. The display pixels are omitted from FIG. 7 to avoid obscuring the present embodiments. As shown in FIG. 7, first display driver circuitry 20A formed along the left peripheral edge of display 14 drives data lines D extending from the left edge, whereas second display driver circuitry 20A' formed along the right peripheral edge of display 14 drives data lines D' extending from the right edge. Data lines D and D' may be electrically isolated from each other at center line 80 (e.g., data lines D are driven using only display driver circuitry 20A, whereas data lines D' are separately driven using only display driver circuitry 20A').

Configured and operated in this way, the data lines near the top edge of display 14 can be truncated and need not be routed around region 40 (i.e., the data lines extending directly towards recessed region 40 are not routed around region 40). As a result, the display border width W1' at the bottom of recessed portion 40 can be further reduced to be approximately equal to the nominal display border width W1 away from region 40. Comparing the arrangement of FIG. 7 to that of FIG. 3A, border width W1' is less than border width W2. The use of separate display driver circuitries 20A and 20A' to drive data lines from opposing sides can therefore facilitate the design of a narrower display border, at least in the area surrounding one or more depressed portions 40. In addition to reducing the border width, using two separate display drivers effectively divides the total data line length that needs to be driven by two, which doubles the available line time (i.e., the available data signal settling time for each row is doubled) and helps save power while simplifying the design of each display driver.

Figure 8:
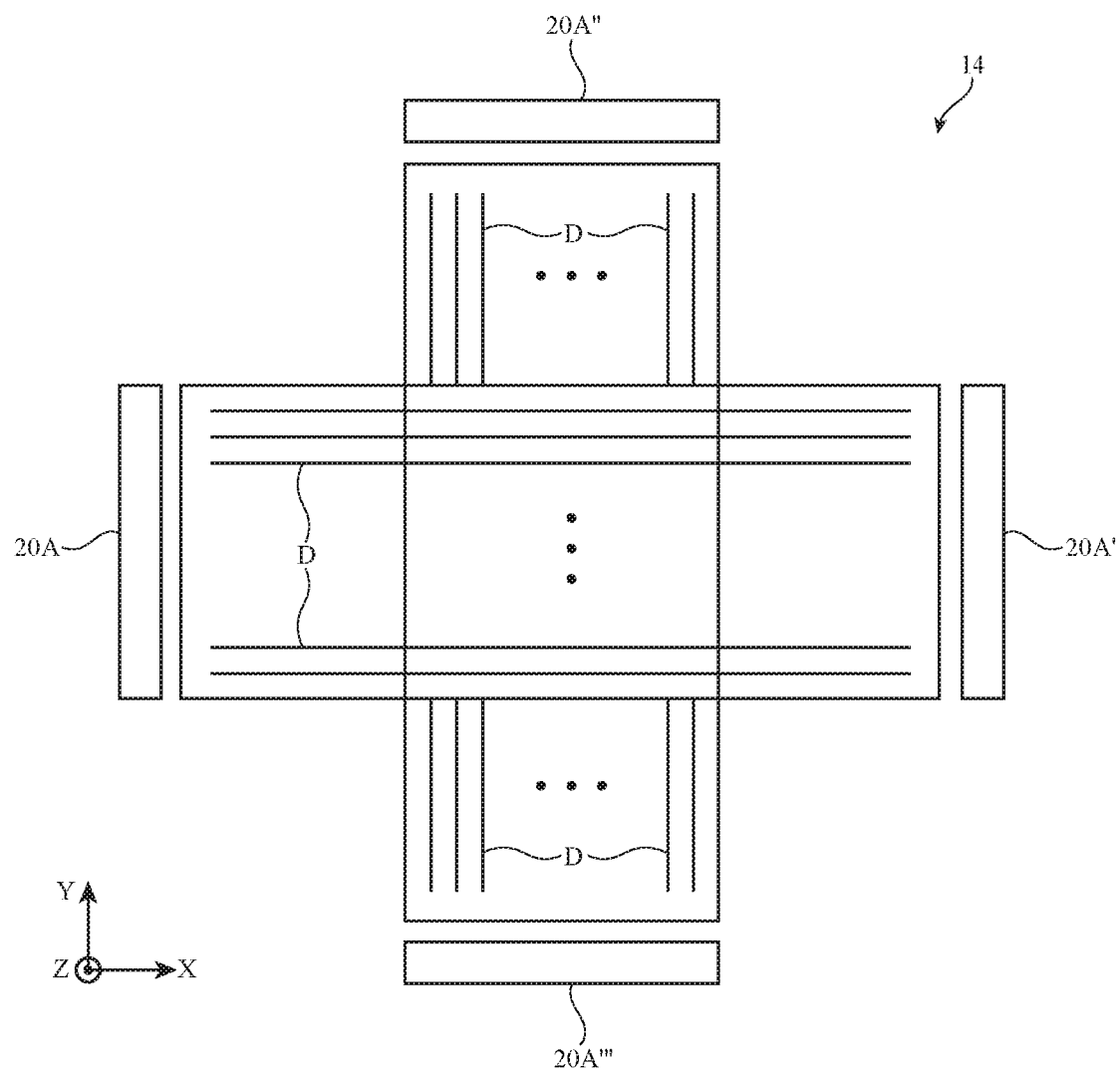
FIG. 8 is a layout view of an illustrative display with more than two distinct display driver circuits in accordance with an embodiment.

The example of FIG. 7 in which two separate driver circuities are used to supply data signals across a display is merely illustrative. If desired, an electronic device may include more than two driver circuities for supplying data signals across a display of any shape, outline, or footprint. FIG. 8 is a front layout view of an illustrative display 14 with a "+" shaped outline/footprint. In the example of FIG. 8, first display driver circuitry 20A may be formed at the left (west) peripheral edge of display 14, second display driver circuitry 20A' may be formed at the right (east) peripheral edge of display 14, third display driver circuitry 20A" may be formed at the top (north) peripheral edge of display 14, and fourth display driver circuitry 20A'" may be formed at the bottom (south) peripheral edge of display 14.

If display driver circuitry 20A is capable of efficiently supplying data signals in the X direction, then circuitry 20A' is optional and may be omitted. Similarly, if display driver circuitry 20A" is capable of efficiently supplying data signals in the Y direction, then circuitry 20A'" is optional and may be omitted. Assuming the data lines running across display 14 in the X direction will prevent data lines from being routed from the north peripheral edge directly to the south peripheral edge (since the horizontal data lines extending between circuitries 20A and 20A' and the vertical data lines extending between circuitries 20A" and 20A' are likely formed in the same metal routing layer(s)), then circuitry 20A" will be used to drive the vertical data lines in the top portion of display 14, whereas circuitry 20A' will be used to separately drive the vertical data lines in the bottom portion of display 14. The example of FIG. 8 in which four different display driver circuitries are used to supply data line signals across display 14 is merely illustrative. In general, display 14 may have any suitable shape or outline and may be driven using at least two, two to four, two to ten, more than ten, fewer than ten, fewer than five, or any suitable number of display driver circuitries formed at or along any peripheral edge of device 10.

In the example of FIG. 7, data lines D driven by first display driver circuitry 20A and data lines D' driven by second display driver circuitry 20A' are electrically isolated by dielectric gaps situated along line 80. Assuming the gaps along line 80 are formed down the center of display 14, the length of data line D to the left of line 80 should be equal to the length of data line D' to the right of line 80 (i.e., data line D and data line D' in the same row have equal lengths). If display driver circuitries 20A and 20A' are perfectly identical, then the voltage values supplied over the respective data lines from the left and right sides would be matching. In practice, however, display driver circuitries 20A and 20A' are often not physically, electrically, and/or operationally identical (e.g., due to manufacturing process variations or other random/systematic deviations). This mismatch between the two display driver circuitries 20A and 20A' can induce a noticeable Mura effect or uneven illumination in the active region around line 80.

Figure 9:
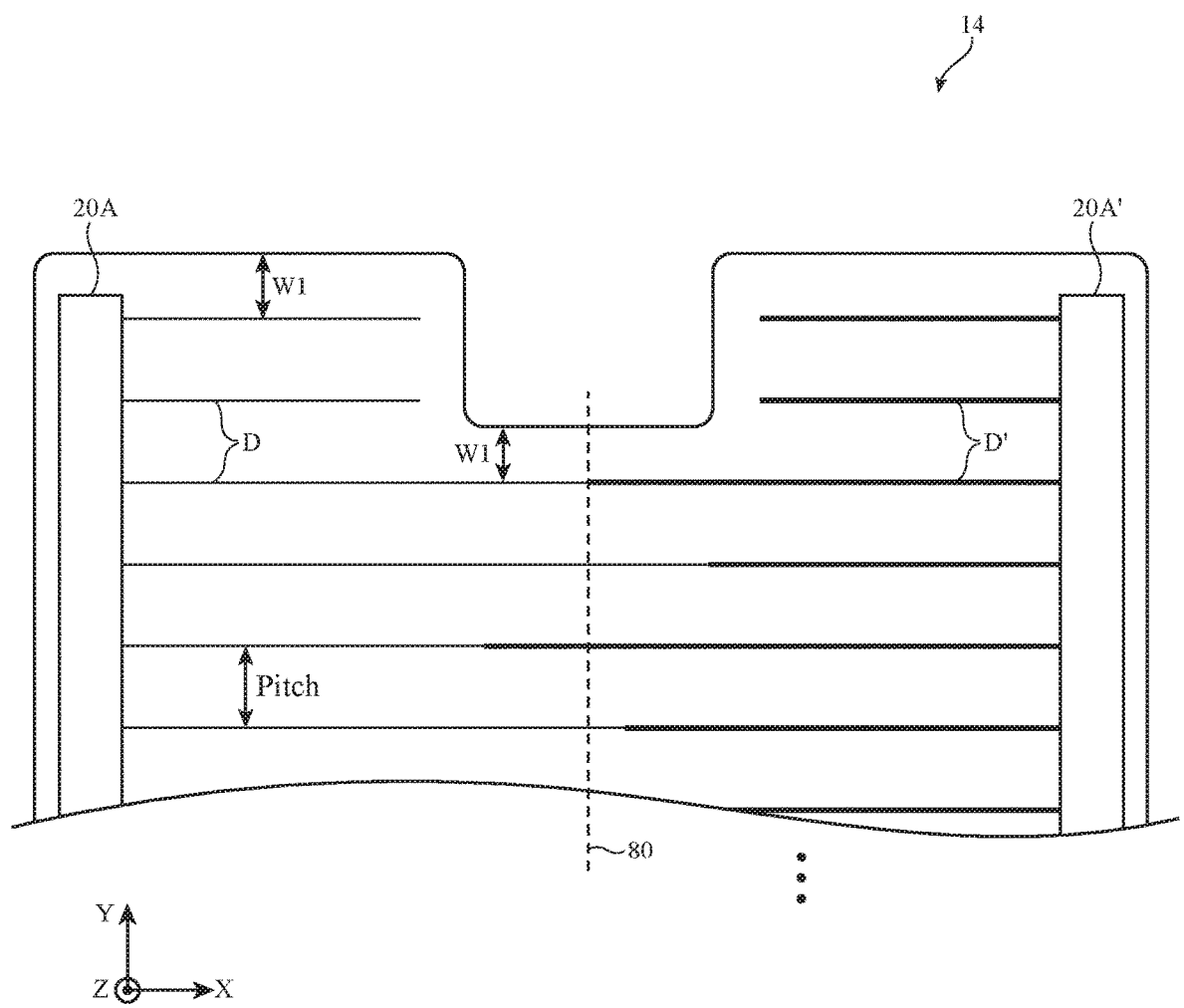
FIG. 9 is a layout view of an illustrative display with two separate display driver circuits configured to drive data lines of different lengths to help mitigate mismatch between the two display driver circuits in accordance with an embodiment.

To mitigate the potential issues associated with display driver mismatch, the data lines can be disconnected at different or random locations from row to row. FIG. 9 is a front layout view of display 14 in which the two display driver circuitries drive data lines of varying lengths. As shown in FIG. 9, the location of the dielectric gaps separating data lines D and D' in each row are not all aligned to center line 80. For example in the third row, the point at which data lines D and D' are disconnected is at a first distance to the left of line 80. In the fourth row, the point at which data lines D and D' are disconnected is at a second distance to the right of line 80. In the fifth row, the point at which data lines D and D' are disconnected is at a third distance to the left of line 80. In the sixth row, the point at which data lines D and D' are disconnected is at a fourth distance to the right of line 80, and so on. At least some of the first, second, third, and fourth distances described above may be equal or may all be different. As a result, the length of data line D and data line D' in a given row may be different, and the length of data line D (and data line D') will also vary from row to row. Forming data lines in this zig-zagged, staggered, off-centered, irregular, or other non-uniform arrangement can help mitigate the Mura effect and other undesirable display artifacts caused by any mismatch between display driver circuitries 20A and 20A'.

Figure 10A:
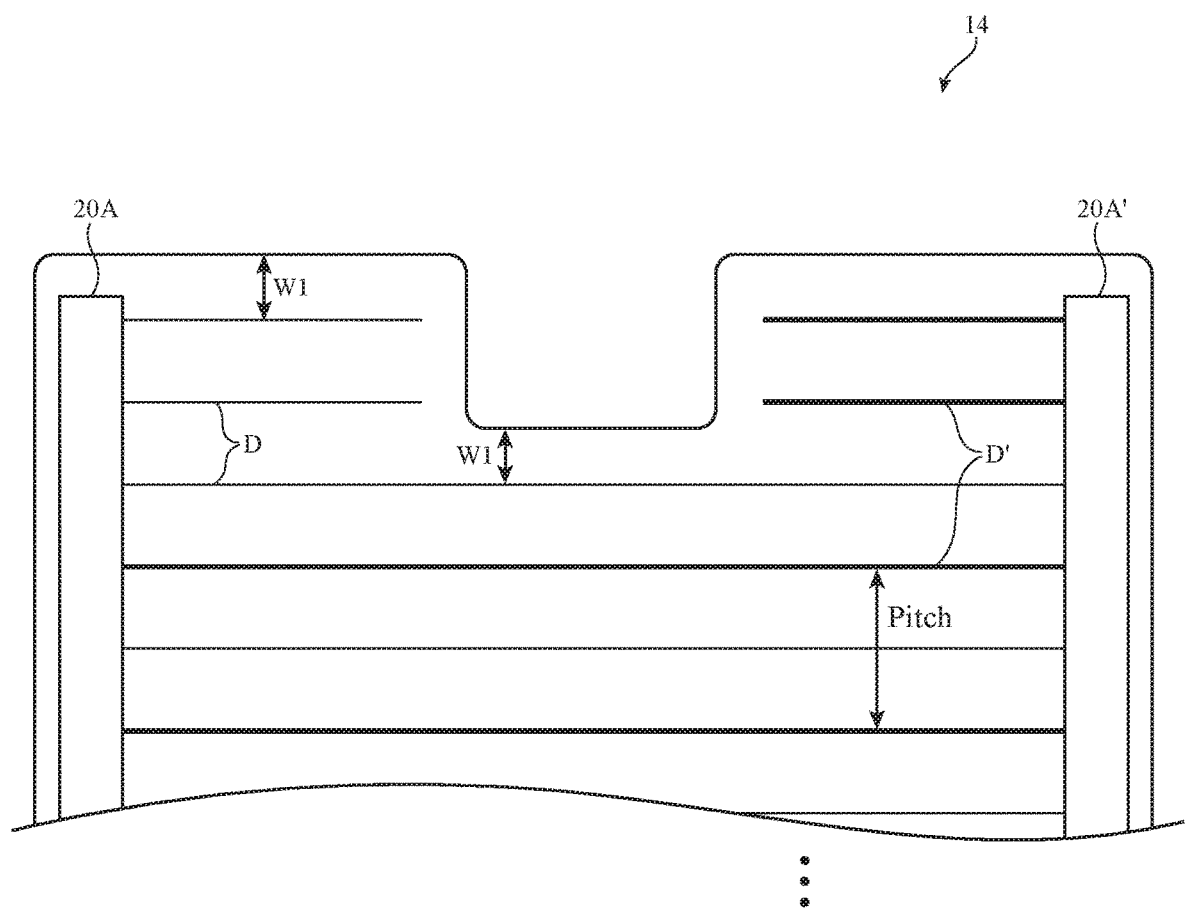
FIG. 10A is a layout view of an illustrative display with a 1-1 interlaced data line pattern to provide spatial averaging between two different display driver circuits in accordance with an embodiment.

FIG. 9 illustrates one way of reducing the effects of display driver mismatch. In accordance with another suitable embodiment, the data lines can be formed using a one-one (1:1) interlacing pattern (see, e.g., FIG. 10A). As shown in FIG. 10A, data lines D in at least the third and fifth rows (and other odd rows below) are driven by display driver circuitry 20A, whereas data lines D' in at least the fourth and sixth rows (and other even rows below) are driven by display driver circuitry 20A'. Interlacing the data lines in this way achieves a spatial averaging effect so that Mura and other undesirable artifacts caused by display driver mismatch is no longer visually detectable. Note also that the pitch between adjacent data lines D driven by circuitry 20A in FIG. 10A is substantially larger than the pitch shown in FIG. 9, which enables display 14 to support higher pixel density (i.e., a display design with more pixels per inch or PPI).

Figure 10B:
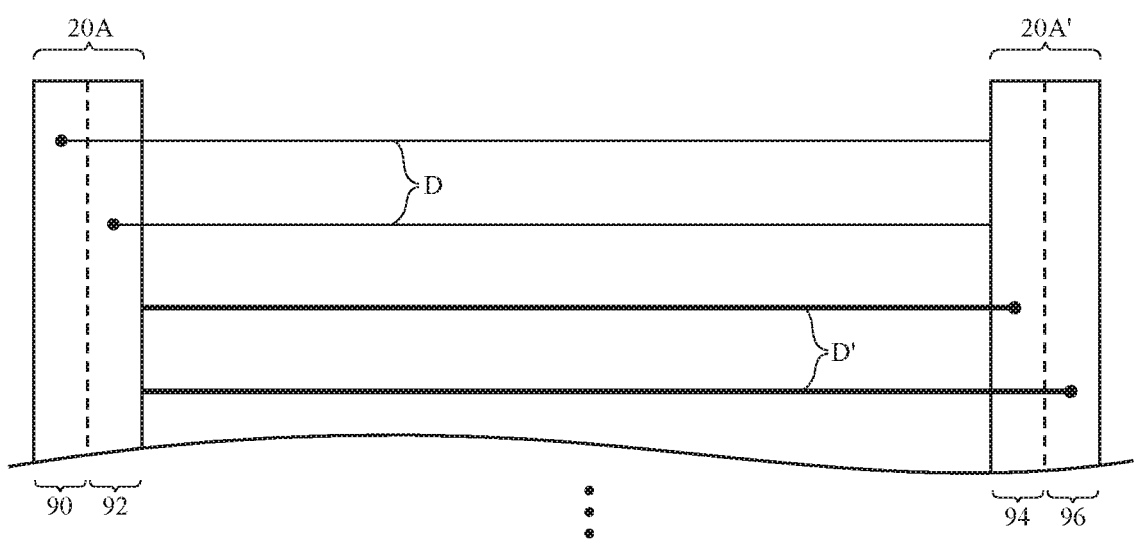
FIG. 10B is a layout view of an illustrative display with a 2-2 interlaced data line pattern to provide spatial averaging between two different display driver circuits in accordance with an embodiment.

The 1:1 data line interlacing configuration of FIG. 10A is merely illustrative. In accordance with another suitable embodiment, the data lines can be formed using a two-two (2:2) interlacing pattern (see, e.g., FIG. 10B). As shown in FIG. 10B, data lines D in the first and second rows are driven by display driver circuitry 20A, whereas data lines D' in at least the third and fourth rows are driven by display driver circuitry 20A'. Interlacing the data lines in this way also achieves a spatial averaging effect so that Mura and other undesirable artifacts caused by display driver mismatch is no longer visually detectable. Note also the circuitry for driving data line D in the first row may be formed in region 90 while the circuitry for driving data line D in the second row may be formed in region 92. Since display driver circuitry 20A no longer needs to drive the data lines in the third and fourth rows, the circuit area required for regions 90 and 92 will be substantially smaller than that required by the display driver designs shown in FIGS. 7 and 9 (since every row needs to be driven by circuitry 20A). In other words, there is more available silicon area to design display driver circuitry 20A, which can dramatically simplify the design process and the complexity of circuitry 20A. This technical improvement also applies to the one-one interlacing example shown in FIG. 10A.

Similarly, the circuitry for driving data line D' in the third row may be formed in region 94 while the circuitry for driving data line D' in the fourth row may be formed in region 96. Since display driver circuitry 20A' no longer needs to drive the data lines in the first and second rows, the circuit area required for regions 94 and 96 will be substantially smaller than that required by the display driver designs shown in FIGS. 7 and 9 where every row needs to be driven by circuitry 20A'. In other words, there is more available circuit area to design display driver circuitry 20A', which can dramatically simplify the design process and the complexity of circuitry 20A'.

The 1:1 interlacing example of FIG. 10A and the 2:2 interlacing example of FIG. 10B are merely illustrative. If desired, a three-three (3:3) interlacing pattern, a one-two-one (1:2:1) interlacing pattern, a two-three-two (2:3:2) interlacing pattern, or other ways of interlacing/interleaving data lines may be employed to help mitigate any potential detrimental effects associated with display driver mismatch, to improve display pixel density, and to simplify the design of the display driver circuitry.

Figure 11:
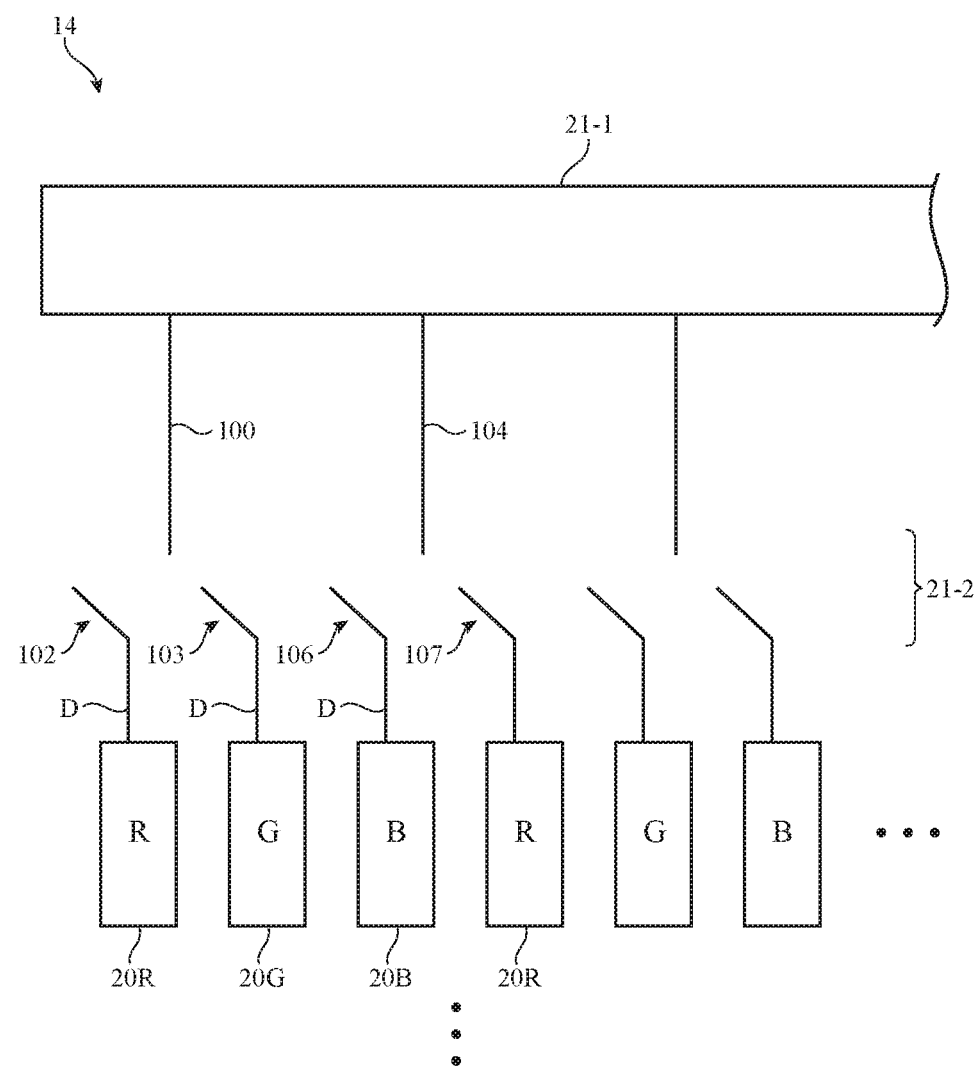
FIG. 11 is a diagram showing one suitable implementation of data line demultiplexer circuitry.

FIG. 11 shows one suitable implementation of demultiplexer circuitry 21-2 (see also FIG. 2). As shown in FIG. 11, display driver circuit 21-1 may be configured to output data line signals that contain grayscale information for multiple color channels such as red (R), green (G), and blue (B) channels. Demultiplexing circuitry 21-2 may then demultiplex these data line signals into respective R, G, and B data line signals on respective data lines D. Demultiplexer circuitry 21-2 may include multiplexer routing switches. In the example of FIG. 11, display driver circuit 21-1 has a first output line 100 that is selectively coupled to a first red display pixel via a first multiplexer routing switch 102 and to a first green display pixel via a second multiplexer routing switch 103. Only one of switches 102 and 103 should be turned on at any given point in time. Similarly, a second output line 104 of display driver circuit 21-2 may be selectively coupled to a first blue display pixel via a third multiplexer routing switch 106 and to a second red display pixel via a fourth multiplexer routing switch 107. Only one of switches 106 and 107 should be turned on at any given point in time.

The multiplexer routing switches (e.g., switches 102, 103, 106, 107, etc.) may be controlled by demultiplexer control signals generated by display driver circuit 21-1. In general, the multiplexer routing switches can be implemented using any suitable type of thin-film transistors (e.g., silicon transistors, semiconducting-oxide transistors, etc.). This configuration in which each data driver circuit output line (e.g., line 100 and line 104) is selectively coupled to one of two data lines D using a pair of multiplexer routing switches is sometimes referred to as a 2-to-1 (2:1) demultiplexing scheme. Operated in this way, the red data line signals will be routed to the red display pixels 20R, the green data line signals will be routed to the green display pixels 20G, and the blue data line signals will be routed to the blue display pixels 20B.

The demultiplexer design of FIG. 11 in which each display driver output line is selectively coupled to display pixels of different colors (e.g., output line 100 is coupled to a red pixel using switch 102 but to a green pixel using switch 103) will generally require display driver circuit 21-1 to output different voltages as switching occurs (i.e., after switch 102 is turned off and before switch 103 is turned on). This is because data line signals associated with different colors typically exhibit different voltage levels. Driving the data lines in this way increases power consumption.

Figure 12:
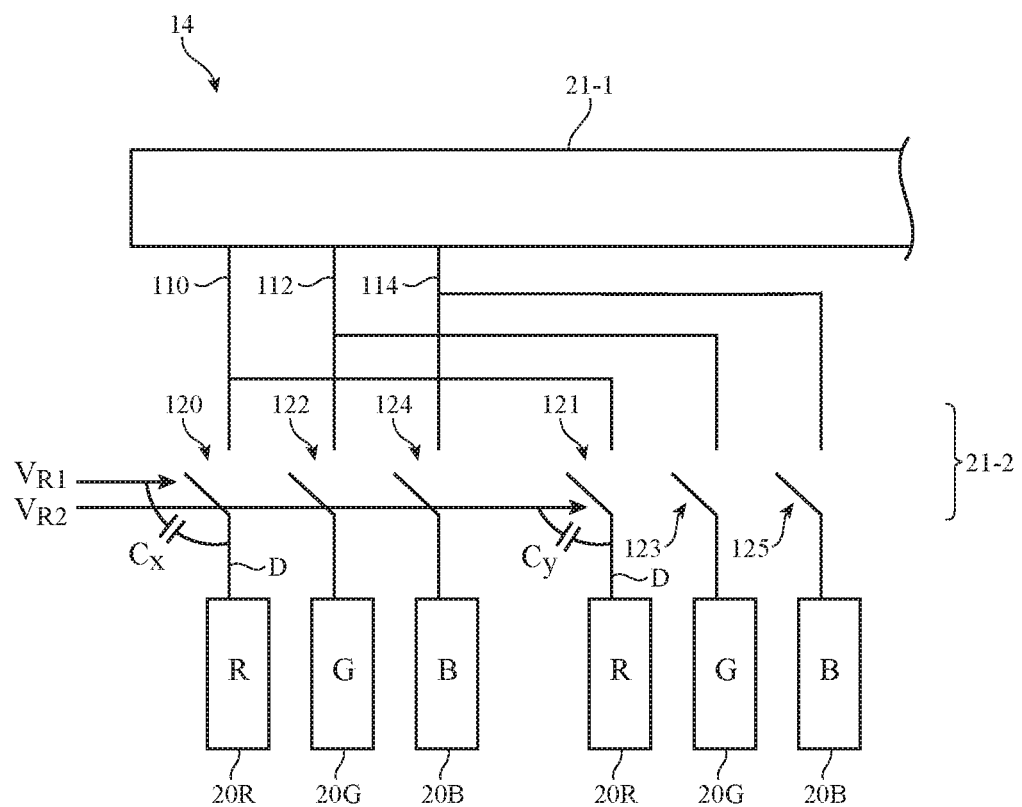
FIG. 12 is a diagram showing another suitable implementation of data line demultiplexer circuitry.

FIG. 12 shows another suitable implementation of two-to-one demultiplexer circuitry 21-2 that can help reduce power consumption. As shown in FIG. 12, display driver circuit 21-1 has a first output line 110 that is selectively coupled to a first red display pixel via multiplexer routing switch 120 and to a second red display pixel via multiplexer routing switch 121. Switch 120 may be controlled by demultiplexer control signal $V_{R1}$, whereas switch 121 may be controlled by demultiplexer control signal $V_{R2}$. The demultiplexer control signals are generated by display driver circuit 21-1. Only one of switches 120 and 121 should be turned on at any given point in time. Similarly, a second output line 112 may be selectively coupled to a first green display pixel via multiplexer routing switch 122 and to a second green display pixel via multiplexer routing switch 123. A third output line 114 may be selectively coupled to a first blue display pixel via multiplexer routing switch 124 and to a second blue display pixel via multiplexer routing switch 125, and so on.

The demultiplexer design of FIG. 12 in which each display driver output line is selectively coupled to display pixels of the same color (e.g., output line 110 is coupled to a red pixel using switch 120 and also to a red pixel using switch 121) will generally reduce the possibility that display driver circuit 21-1 will have to output drastically different voltages as switching occurs (i.e., after switch 120 is turned off and before switch 121 is turned on). This is because data line signals for pixels of the same color in the same general vicinity will typically exhibit relatively similar voltage levels. Driving the data lines in this way can therefore reduce power consumption.

As described in connection with at least FIG. 5B, different data lines can sometimes exhibit different loading characteristics. Due to this data line loading difference, the voltage kickback/feedthrough or charge injection that occurs as control signal $V_{R1}$ is pulsed (as a result of parasitic coupling capacitance Cx) will be different from the voltage kickback or charge injection that occurs as control signal $V_{R2}$ is pulsed (as a result of parasitic coupling capacitance Cy). This difference in voltage coupling can cause data values that should otherwise be equal to be displayed differently when driven into the display pixels.

Figure 13:
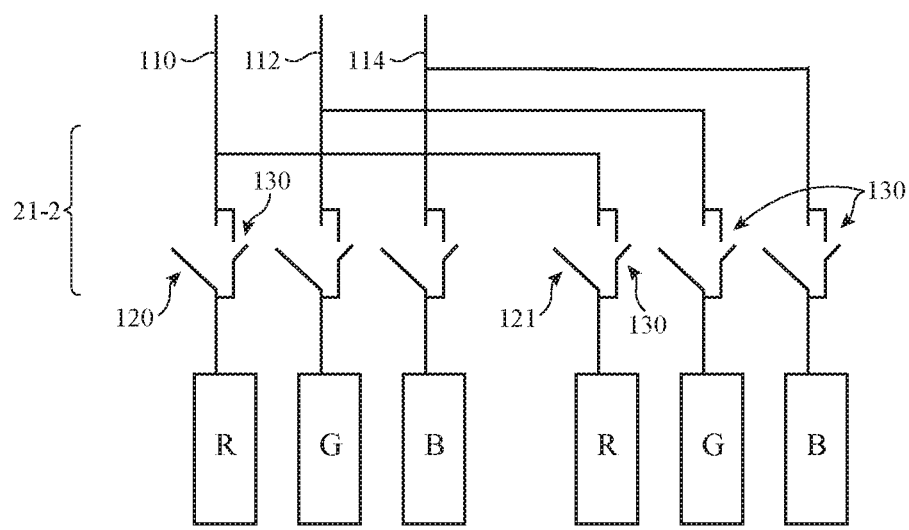
FIG. 13 is diagram showing how the data line demultiplexer circuitry shown in FIG. 12 is provided with additional switches in accordance with an embodiment.
Figure 14:
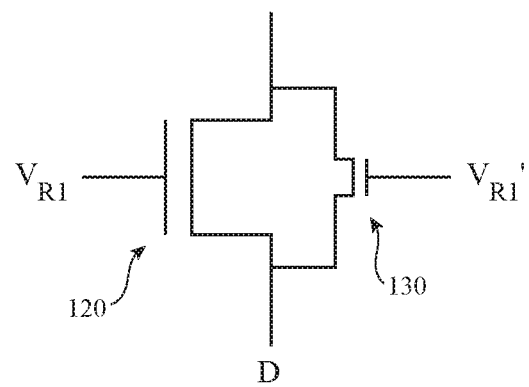
FIG. 14 is a circuit diagram showing how a demultiplexer switch is coupled in parallel with an additional switch in accordance with an embodiment.

To reduce the amount of voltage kick and uneven charge injection, an additional switch such as switch 130 may be coupled in parallel with each of the demultiplexer routing switches (see, e.g., FIG. 13). FIG. 14 shows how switch 130 is coupled in parallel with demultiplexer routing switch 120. Multiplexer routing switch 120 may receive control signal $V_{R1}$, whereas additional switch 130 may receive control signal $V_{R1}'$. Switch 130 may be smaller than demultiplexer routing 120. For example, switch 130 may be half the size of switch 120, a quarter of the size of switch 120, a tenth of the size of switch 120, three-quarters the size of switch 120, at least 10% smaller than switch 120, at least 50% smaller than switch 120, at least 80% smaller than switch 120, 10-90% smaller than switch 120, etc.

Figure 15:
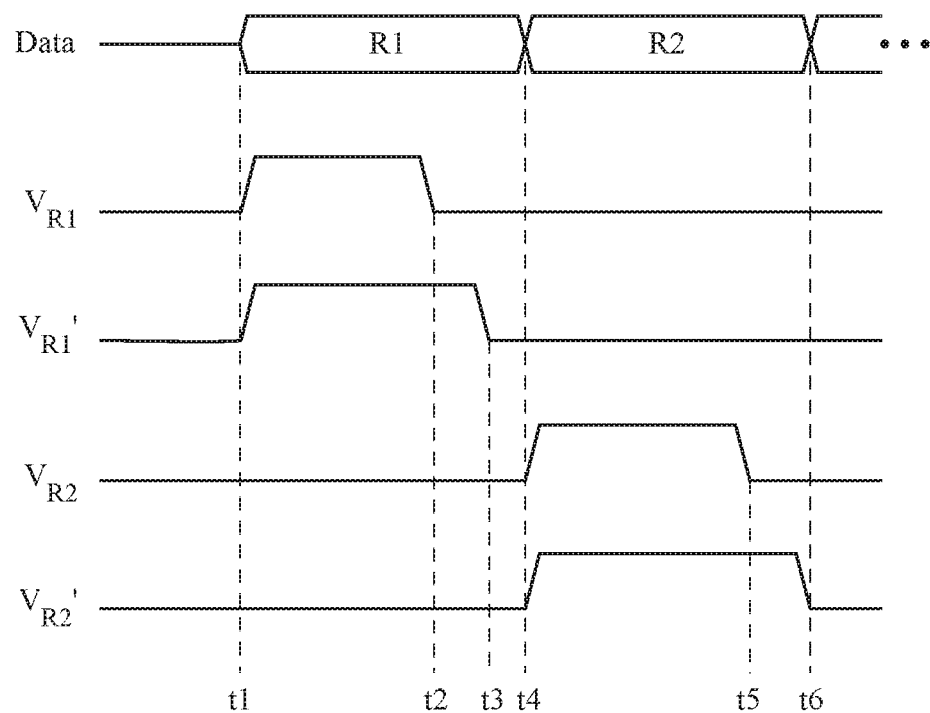
FIG. 15 is a timing diagram illustrating the operation of the demultiplexer circuitry of the type shown in FIG. 13 in accordance with an embodiment.

FIG. 15 is a timing diagram illustrating the operation of demultiplexer circuitry 21-2 of the type shown in FIGS. 13 and 14. At time t1, a first red data signal R1 can be routed to a first red display pixel via switches 120 and 130 (e.g., both signal $V_{R1}$ that controls switch 120 and signal $V_{R1}'$ that controls switch 130 coupled in parallel with switch 120 are asserted or driven high at time 0). At time t2, signal $V_{R1}$ will be deasserted (e.g., driven low) first to turn off switch 120. A bit later at time t3, signal $V_{R1}'$ will be deasserted to turn off switch 130. Turning off switch 120 first while switch 130 is still on allows switch 130 to nullify or short out any undesirable parasitic coupling effects associated with the larger switch 120. When switch 130 is turned off at time t3, there might still be some voltage kick and charge injection. The amount of voltage coupling and charge injection contributed by switch 130, however, will be much smaller than that of switch 120 since switch 130 is substantially smaller than switch 130.

At time t4, a second red data signal R2 can be routed to a second red display pixel via switches 121 and 130 (e.g., both signal $V_{R2}$ that controls switch 121 and signal $V_{R2}'$ that controls switch 130 coupled in parallel with switch 121 are asserted or driven high at time t4). At time t5, signal $V_{R2}$ will be deasserted first to turn off switch 121. A bit later at time t6, signal $V_{R2}'$ will be deasserted to turn off switch 130. Turning off switch 121 first while the associated switch 130 is still on allows switch 130 to nullify or short out any undesirable parasitic coupling effects associated with the larger switch 121. When switch 130 is turned off at time t6, there might still be some voltage kick and charge injection. However, the amount of voltage coupling and charge injection contributed by the smaller switch 130 will be much smaller than that associated with the larger switch 120.

Configuring and operating demultiplexing circuitry 21-2 in this way can therefore help mitigate the effects associated with any difference in data line loading. In general, the demultiplexer designs shown and described in connection with FIGS. 11-15 are not mutually exclusive with the embodiments of FIGS. 3-10 and can thus be incorporated into a single electronic device.

Moreover, the techniques described above in connection with FIGS. 3-15 directed towards driving data lines in a display is merely illustrative and is not intended to limit the scope of the present embodiments. If desired, the techniques for routing data lines around a locally recessed region to reduce display border width, for forming data lines in at least two different metal routing layers to reduce display border width, for forming each data line using segments formed in different metal routing layers to mitigate loading difference, for forming display driver circuitries along different device housing peripheral edges to avoid having to route around a locally depressed region, for disconnecting data lines at random locations to mitigate any visible Mura effect, for interlacing data lines to achieve higher pixel density, and for using smaller parallel switches to reduce voltage kick and charge injection can also be applied to gate lines, scan control lines, emission control lines, reset control lines, initialization lines, touch sensing lines, or other suitable control lines that are routed across display 14.

The foregoing is merely illustrative and various modifications can be made to the described embodiments. The foregoing embodiments may be implemented individually or in any combination.

What is claimed is:

1. An electronic device, comprising:
   an array of display pixels; and
   display driver circuitry configured to drive a plurality of data lines that provide data signals to the array of display pixels, wherein at least some of the plurality of data lines are routed around and along a depressed device housing region, and wherein the at least some of the plurality of data lines are formed in at least a first metal routing layer and a second metal routing layer that is different than the first metal routing layer to reduce a display border width surrounding the depressed device housing region.

2. The electronic device of claim 1, wherein the depressed device housing region defines a selected one of: a peripheral housing edge forming a rectangular recessed region, a peripheral housing edge forming a dished recessed region, a curved peripheral housing edge, a peripheral housing edge forming a triangular recessed region, and a peripheral housing edge forming a notched region.

3. The electronic device of claim 1, wherein a first data line in the plurality of data lines is formed in the first metal routing layer, and wherein a second data line immediately adjacent to the first data line in the plurality of data lines is formed in the second metal routing layer.

4. The electronic device of claim 3, wherein a third data line immediately adjacent to the second data line in the plurality of data lines is formed in the first metal routing layer, and wherein a fourth data line immediately adjacent to the third data line in the plurality of data lines is formed in the second metal routing layer.

5. The electronic device of claim 1, wherein a first data line in the plurality of data lines comprises a first segment formed in the first metal routing layer and a second segment formed in the second metal routing layer, and wherein the first and second segments of the first data line are coupled together using a first conductive via.

6. The electronic device of claim 5, wherein a second data line in the plurality of data lines comprises a first segment formed in the first metal routing layer and a second segment formed in the second metal routing layer, and wherein the first and second segments of the second data line are coupled together using a second conductive via.

7. The electronic device of claim 6, wherein the first segment of the first data line is immediately adjacent and runs parallel to the second segment of the second data line, and wherein the second segment of the first data line is immediately adjacent and runs parallel to the first segment of the second data line.

8. The electronic device of claim 7, wherein the first and second conductive vias are staggered and are not laterally aligned with respect to each other.

9. The electronic device of claim 8, whereas the first segment of the first data line has a first length, and wherein the second segment of the first data line has a second length that is different than the first length.

10. The electronic device of claim 1, wherein the display driver circuitry comprises:
    a display driver circuit; and
    demultiplexer circuitry configured to receive signals from the display driver circuit, wherein the demultiplexer circuitry comprises:
      a first switch coupling an output line of the display driver circuit to a first display pixel of a given color;
      a second switch coupling the output line of the display driver circuit to a second display pixel of the given color;
      a third switch coupled in parallel with the first switch, wherein the third switch is smaller than the first switch, and wherein the third switch is turned off after the first switch; and
      a fourth switch coupled in parallel with the second switch, wherein the fourth switch is smaller than the second switch, and wherein the fourth switch is turned off after the third switch.

11. An electronic device, comprising:
    a device housing with a recessed portion; and
    a display formed within the device housing, wherein the display comprises:
      first display driver circuitry formed along a first peripheral edge of the device housing, wherein the first display driver circuitry is configured to drive a first set of data lines, and wherein at least some data lines in the first set of data lines extending directly towards the recessed portion are not routed around the recessed portion; and
      second display driver circuitry formed along a second peripheral edge of the device housing, wherein the second display driver circuitry is configured to drive a second set of data lines, and wherein at least some data lines in the second set of data lines extending directly towards the recessed portion are not routed around the recessed portion.

12. The electronic device of claim 11, wherein the recessed portion comprises a locally narrowed portion of the device housing when viewed from the front of the display.

13. The electronic device of claim 12, wherein the display has an at least partially curved profile when viewed from above the display.

14. The electronic device of claim 11, wherein the first set of data lines and the second set of data lines are disconnected from one another at random locations to reduce the visibility of undesired display artifacts.

15. The electronic device of claim 11, wherein the first set of data lines and the second set of data lines are interlaced to achieve higher pixel density.

16. An electronic device, comprising:
    an array of display pixels;
    a display driver circuit configured to generate data signals; and
    demultiplexer circuitry configured to route the data signals to the array of display pixels, wherein the demultiplexer circuitry comprises:
      a first multiplexer routing switch coupling a first output line from the display driver circuit to a first display pixel of a first color in the array;

a switch coupled in parallel with the first multiplexer routing switch, wherein the switch is smaller than the first multiplexer routing switch; and a second multiplexer routing switch coupling the first output line from the display driver circuit to a second display pixel of the first color in the array.

17. The electronic device of claim 16, wherein the demultiplexer circuitry of claim 16 further comprises:

a third multiplexer routing switch coupling a second output line from the display driver circuit to a third display pixel of a second color in the array, wherein the second color is different than the first color; and a fourth multiplexer routing switch coupling the second output line from the display driver circuit to a fourth display pixel of the second color in the array.

18. The electronic device of claim 16, wherein the demultiplexer circuitry further comprises:

an additional switch coupled in parallel with the second multiplexer routing switch, wherein the additional switch is smaller than the second multiplexer routing switch.

19. The electronic device of claim 18, wherein the switch is less than half the size of the first multiplexer routing switch.

20. The electronic device of claim 18, wherein the switch is turned off after the first multiplexer routing switch is turned off when loading a data signal into the first display pixel.

* * * * *